United States Patent
Foti

(10) Patent No.: US 9,660,949 B2
(45) Date of Patent: May 23, 2017

(54) DISTRIBUTED GEOMESSAGING ARCHITECTURE

(75) Inventor: George Foti, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 181 days.

(21) Appl. No.: 13/607,112

(22) Filed: Sep. 7, 2012

(65) Prior Publication Data

US 2013/0311547 A1 Nov. 21, 2013

Related U.S. Application Data

(60) Provisional application No. 61/647,255, filed on May 15, 2012.

(51) Int. Cl.
| | |
|---|---|
| *H04L 12/24* | (2006.01) |
| *H04L 12/58* | (2006.01) |
| *H04L 29/08* | (2006.01) |
| *H04L 29/06* | (2006.01) |
| *H04W 4/00* | (2009.01) |
| *H04W 4/02* | (2009.01) |

(52) U.S. Cl.
CPC .......... *H04L 51/20* (2013.01); *H04L 41/0896* (2013.01); *H04L 67/1021* (2013.01); *H04L 67/1025* (2013.01); *H04L 67/18* (2013.01); *H04L 69/24* (2013.01); *H04L 12/5865* (2013.01); *H04L 51/043* (2013.01); *H04W 4/001* (2013.01); *H04W 4/02* (2013.01)

(58) Field of Classification Search
CPC . H04L 65/1073; H04L 67/18; H04L 67/2814; H04L 69/40

USPC ................ 709/203, 206, 217, 219, 223, 224
See application file for complete search history.

(56) References Cited

U.S. PATENT DOCUMENTS

| | | | |
|---|---|---|---|
| 8,671,206 B2 * | 3/2014 | Fieremans | H04W 4/001 709/228 |
| 2005/0113123 A1 * | 5/2005 | Torvinen | H04W 4/021 455/519 |
| 2006/0206610 A1 | 9/2006 | Ling et al. | |
| 2011/0053611 A1 * | 3/2011 | Loeb | H04W 4/02 455/456.3 |
| 2011/0219226 A1 * | 9/2011 | Olsson | G06F 21/6245 713/150 |
| 2012/0203822 A1 * | 8/2012 | Floyd | H04L 41/0896 709/203 |

(Continued)

FOREIGN PATENT DOCUMENTS

| | | |
|---|---|---|
| CN | 1885365 A | 12/2006 |
| CN | 101310267 A | 11/2008 |

(Continued)

OTHER PUBLICATIONS

TS 103 084 V<0.0.0>, Geomessaging Enabler, Technical Specification, Mar. 2012, pp. 1-21.

(Continued)

*Primary Examiner* — Barbara Burgess
(74) *Attorney, Agent, or Firm* — Francois Cartier; Ericsson Canada Inc.

(57) ABSTRACT

Methods and systems for providing geomessaging clients mobility between different geomessaging servers are discussed with relation to the interaction of nodes in either an IMS or a non-IMS based network.

25 Claims, 12 Drawing Sheets

(56) References Cited

U.S. PATENT DOCUMENTS

2012/0204266 A1* 8/2012 Yoo ..................... G06F 21/56
                                              726/24
2013/0066960 A1* 3/2013 Fieremans ............ H04W 4/001
                                              709/203

FOREIGN PATENT DOCUMENTS

| CN | 101799977 A | 8/2010 |
| NO | 2012/055433 A1 | 5/2012 |
| WO | 2012/055433 A1 | 5/2012 |

OTHER PUBLICATIONS

International Search Report from corresponding application PCT/IB2013/053988.
Draft ETSI TR 102 926 V0.0.4, Intelligent Transport Systems; Framework for public mobile networks in cooperative ITS (C-ITS), Nov. 2011, pp. 1-76.
Office action and search report from corresponding CN application 201380032262X, 5 pages.
Espacenet, Abstract in English of CN 1885365, 1 page.
Espacenet, Abstract in English of CN 101799977, 1 page.

* cited by examiner

DISTRIBUTED GEOMESSAGING ARCHITECTURE

CROSS REFERENCE TO RELATED APPLICATIONS

This application claims the benefit of priority from U.S. Provisional Patent Application No. 61/647,255 entitled "Distributed Geomessaging Architecture" filed on May 15, 2012, the contents of which are expressly incorporated herein by reference in their entirety.

TECHNICAL FIELD

This disclosure relates generally to a geomessaging system responsible for message dissemination based on geographical locations, and consisting of a geomessaging client operating in a distributed environment and in an IMS core network or an IP Network transparently, moving from an area served by a first geomessaging server to an area served by a second geomessaging server

BACKGROUND

In existing Intelligent Transportation Systems (ITS), an ad hoc peer-to-peer distribution network is created using low power transmitters and receivers in vehicles. Co-operative ITS (C-ITS) applications make use of an ad-hoc broadcast messaging network that is created by a collection of vehicles each of which has C-ITS applications broadcasting information to the nearby vehicles. The messages exchanged can provide information about a vehicle's location, bearing and speed, or they can contain alert information related to road conditions or sudden events such as unexpected braking, component failures etc. These ad hoc networks provide information to nearby vehicles, which in turn can relay the information to other nearby vehicles, but only vehicle generated data is transmitted, and the transmitted data cannot be received if other vehicles are not within range.

There has been focus on the creation of an infrastructure based network to overlay the ad hoc network. The infrastructure based network makes use of bridge points that are part of both the infrastructure network and the ad hoc network. These bridge points allow a subset of the messages relayed on the ad hoc network to be re-transmitted into the infrastructure based network. The infrastructure based network can then make use of a large number of data points and more powerful computing platforms to derive additional information and to provide additional services. The resulting messages can then be sent back to the bridge points and relayed across the ad hoc network.

When interacting with the infrastructure based network, a geomessaging client (also referred to as a geoclient) will be served by a first geomessaging server that is responsible for a first geographic region. When the geomessaging client moves out of the region served by the first geomessaging server, it will have to connect to a second geomessaging server serving the new location where the GeoClient has moved to. At present, infrastructure based networks, are envisioned as being based on either conventional Internet Protocol (IP) based networks, or based on IP Multimedia Subsystem (IMS) based networks. As a particular vehicle may be required to interact with at least one of the two systems, it is preferable that the architecture of the infrastructure based network will support the same vehicle based client regardless of whether the network is IP or IMS based. Furthermore, it may be advantageous if infrastructure nodes perform the same function regardless of the signaling technology employed and do so transparently to the geoclient.

At present, no such system has been developed or deployed. However, it is recognized that there are other networks with mobile nodes that move from one service area to another.

One skilled in the art will appreciate that mobile devices in a cellular network are subject to handovers between network service providers. In this process, a mobile device (e.g. a telephone handset) is served by a first network provider. When it moves outside the service area of the first network provider it loses service and thus determines that it is no longer in a service area of a first network provider. The handset can then perform a scan to build a list of available service providers. From this list, a new service provider is selected (typically by selecting a network provider on the list of available service providers that is also in a list of service providers with whom the first network provider has roaming agreements.) At this point, the handset begins the registration process with the second network. In some cases an active call may be maintained during this handover, but in many cases a hard hand over is required and the call is dropped. In either situation, the handset is an integral part of the process of selecting a new service provider. Additionally, the first network provider is not notified of the departure of the device, and instead only determines that the device is not active when it is no longer reachable by a network paging function. Such a handover system is not feasible for an ITS system. It is preferable that the user be able to be seamlessly transitioned between service providers when a boundary is reached.

Therefore, it would be desirable to provide a system and method that obviate or mitigate the above described problems.

SUMMARY

It is an object of the present invention to obviate or mitigate at least one disadvantage of the prior art.

In a first aspect of the present invention there is provided a method, for execution at a geomessaging registry, of transferring responsibility for a geomessaging client associated with a vehicle based intelligent transportation system (ITS) platform from a first server responsible for a first geographic area to a second server responsible for a second geographic area. The method comprises receiving an indication, originating from the geomessaging client, of a change from the first geographic area to the second geographic area; instructing the second server to register the geomessaging client; instructing the first server to unregister the geomessaging client; and transmitting towards the geomessaging client identification of a second server and instructions to communicate with the second server in place of the first server.

In an embodiment of the first aspect of the present invention, the step of receiving an indication includes receiving a SIP NOTIFY message from a presence server responsive to receipt, by the presence server, of a location update originating from the geomessaging client. In another embodiment, the step of instructing the first server is performed prior to the step of instructing the second server. In a further embodiment, the step of instructing the second server includes transmitting a SIP message identifying the geomessaging client, a new location associated with the geomessaging client and contact information associated with the geomessaging client. In another embodiment, the step of instructing the first server includes transmitting a SIP message instructing the first server to remove information associated with the geomessaging client, where optionally, the SIP message also identifies a location associated with the geomessaging client by the first server. In a further embodiment, the step of transmitting includes transmitting identification of the second server to an IMS gateway associated with the geoclient, and optionally the identification of the second server is accompanied by identification of the geoclient.

In another embodiment of the first aspect of the present invention, the step of receiving includes receiving and HTTP POST message from the geoclient. In another embodiment, the HTTP POST message includes new location information, contact information and application identification associated with the geoclient. In a further embodiment, the step of instructing the first server includes transmitting an HTTP POST message determined in accordance with the received HTTP POST message. In another embodiment, the step of instructing the second server includes transmitting an HTTP POST message determined in accordance with the received HTTP POST message. In a further embodiment, the step of transmitting includes receiving from the second server identification information in an HTTP 200 OK message where optionally, the identification information received from the second server includes binding information for use by the Geoclient. In another embodiment, the step of transmitting further includes transmitting the identification of a second server to the geomessaging client in an HTTP 200 OK message, and optionally the transmitted HTTP 200 OK message is created in accordance with the received HTTP 200 OK message.

In a further embodiment, the method further includes the step of associating the geomessaging client with the second server in a memory accessible to the geomessaging registry.

In a second aspect of the present invention, there is provided a geomessaging registry for associating a geomessaging client with one of a plurality of geomessaging enablement servers. The registry comprises a network interface and a processor. The network interface can be used for communicating with the geomessaging client and with each of the plurality of geomessaging enablement servers. The processor can be used for determining in accordance with a communication associated with the geomessaging client that the geomessaging client is associated with a first geomessaging enablement server in the plurality but should be associated with a second geomessaging enablement server in the plurality and, responsive to this determination, for transmitting instructions to the first geomessaging enablement server to remove data associate with the geomessaging client, to the second geomessaging enablement server to being providing geomessaging enablement services to the geoclient, and towards the geoclient to begin using services provided by the second geomessaging enablement server.

In an embodiment of the second aspect of the present invention, network interface communicates directly with the geomessaging client using HTTP. In another embodiment of the present invention, the network interface communicates with the geomessaging client through an IMS/HTTP gateway.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for facilitating the movement of a geomessaging client from one network segment to another.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The discussion of an infrastructure based ITS network will now be presented, first with a discussion of a vehicle based ITS platform, then with an overview of an exemplary network topology in which the platform can operate. It will be recognized that options and variations are presented in combination with each other for exemplary purposes. This should not be considered as limiting. Discussion of features should be considered to be standalone unless where explicitly recited.

Figure 1:
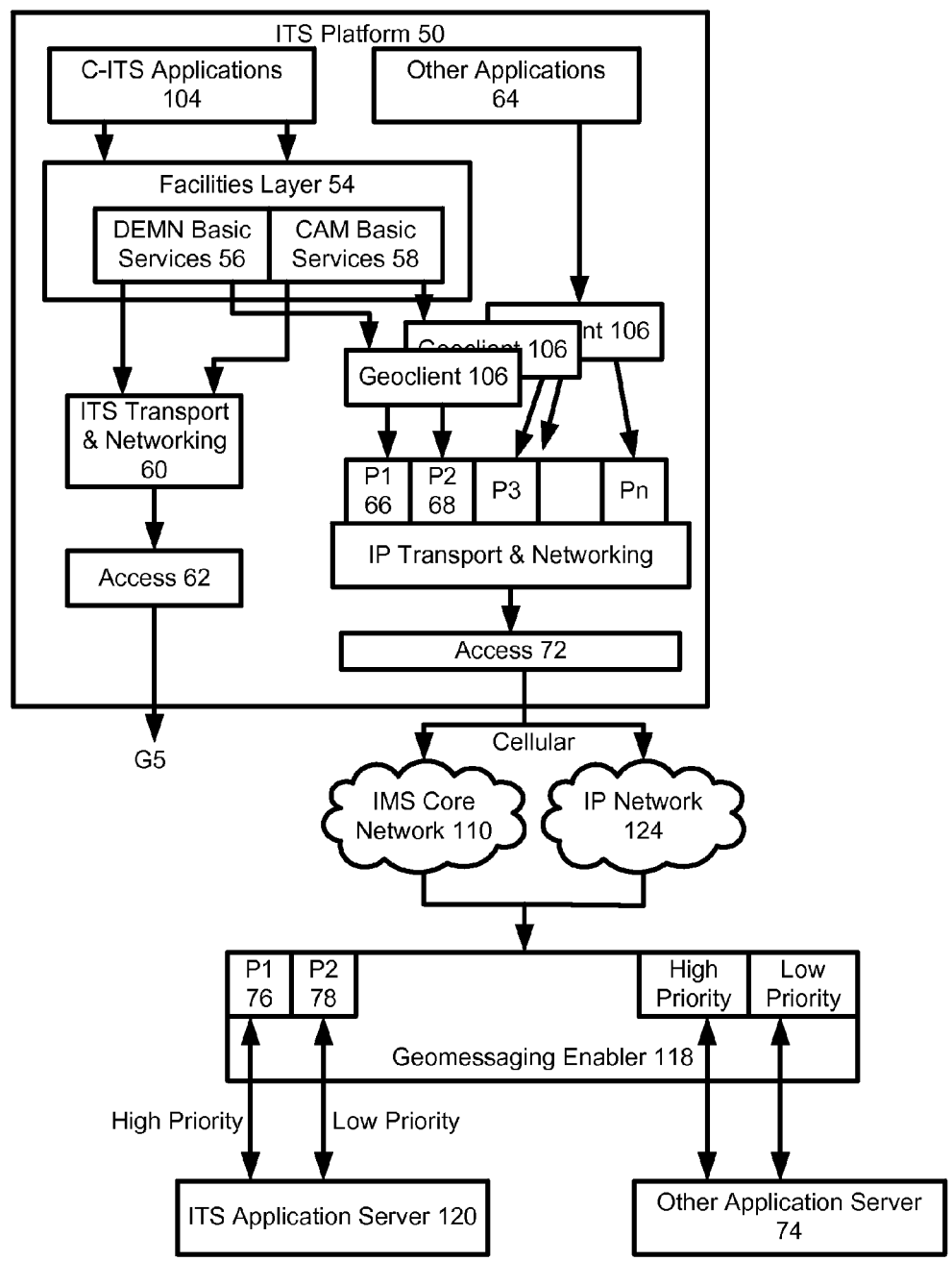
FIG. 1 illustrates an exemplary architecture for vehicle based ITS platform.

A vehicle based ITS platform 50, of an embodiment of the present invention, maintains its existing ad-hoc network elements and can appear to vehicles containing only legacy ITS equipment as identical to other parts of the co-operative ad hoc ITS network. As illustrated in FIG. 1, ITS platform 50 can host a plurality of co-operative ITS (C-ITS) applications 104 which make use of services provided by facilities layer 54, such services can include the DENM Basic Services 56 as well as the CAM basic services 58. This structure allows a C-ITS application to be designed without having to worry about common functionality that can be abstracted and provided separately. The services provided by facilities layer 54 provide an interface to the conventional ITS Transport & networking functions 60 allowing access to the conventional G5 network through access interface 62. One skilled in the art will appreciate that this portion of ITS platform 50 closely mirrors the existing design of an ITS platform. However, ITS platform 50 hosts instantiations of a geoclient 106 that can serve as a connection between the C-ITS application 104 and an infrastructure based ITS network, via the facilities layer 54. In some embodiment, ITS platform 50 can also host other applications 64 that are provided with network functionality through an instantiation of geoclient 106. An IP Transport and Networking layer 70 provides networking functions to each instantiation of geoclient 106, and through access interface 72, networking connectivity. Access interface 72 can provide ITS platform 50 with access to a geomessaging enabler 118 through either of an IMS core network 110 or an IP network 124. Through geomessaging enabler 118, the ITS platform 50 can access applications provided by ITS application server 120 or other application servers 74.

The DENM basic service 56 can serve a plurality of C-ITS applications 104 and make use of a single instantiation of geoclient 106. This instantiation can reserve two ports, P1 66 and P2 68 in IP Transport and Networking layer 70 for incoming traffic associated with the DENM basic service 56. Similarly, a single instantiation of geoclient 106 can provide services to the CAM basic Services 58 accessed by a plurality of C-ITS applications 104. This instantiation of geoclient 106 paired to the CAM Basic Services 58 can also reserve two ports in the IP Transport and Networking layer 70. Geoclient 106 can designate one of the two reserved ports for use in high priority messaging (e.g. messaging in which a QoS is desired) and the other of the reserved ports for use in a lower priority messaging (e.g. messaging in which best effort delivery is sufficient). The port designations can be provided to geomessaging enabler 118. High priority port 76 and Low Priority port 78 can also be reserved in the Geomessaging enabler 118 by ITS application server 120 for handling of traffic associated with the ITS application server 120, via the Geomessaging Enabler 188, and which interacts with the instantiation of geoclient 106 associated with the DENM Basic Services 56. Other ports can be reserved for high and low priority messages for the interactions with the CAM basic services (or the same high and low port pairing can be re-used on the geomessaging enabler 118). Similarly, other application server 74 can reserve high and low priority ports if necessary.

During a registration process, to be discussed later, specific port reservations can be exchanged between the geoclient 106 and the geomessaging enabler 118 so that each is able to transmit high and low priority messages to the correct port.

It will also be understood that in DEMN and CAM based messaging, a priority is assigned to the message, and is embedded in the message itself. When transmitted over the G5 network, it is the C-ITS application 104 itself that determines whether a received message is a high or low priority message. However, when relaying information generated by C-ITS application 104, geoclient 106 will preferably parse the received message to extract priority related information. It is not essential that the Geoclient 106 be able to fully understand the messages that it handles, but instead Geoclient 106 only needs to be able to extract and parse the priority information. This allows Geoclient 106 to direct the message to the correct port of Geomessaging enabler 118. Similarly, upon receipt of a message from Geomessaging enabler 118, geoclient 106 is able to immediately determine the priority of a received message based on the port on which it is received.

In some embodiments, ports can be pre-assigned for particular applications, but it is also envisioned that the port assignment for each application hosted by the ITS platform 50, and each application hosted by ITS application server 120 and other application server 74 can be dynamically configured to make use of available ports in the IP Transport and Networking layer 70 and the Geomessaging enabler 118 respectively. By not forcing a reliance on dedicated port assignments, there is no need for a general consensus between providers of ITS platforms 50 or between service providers offering geomessaging enablers 118.

Figure 2:
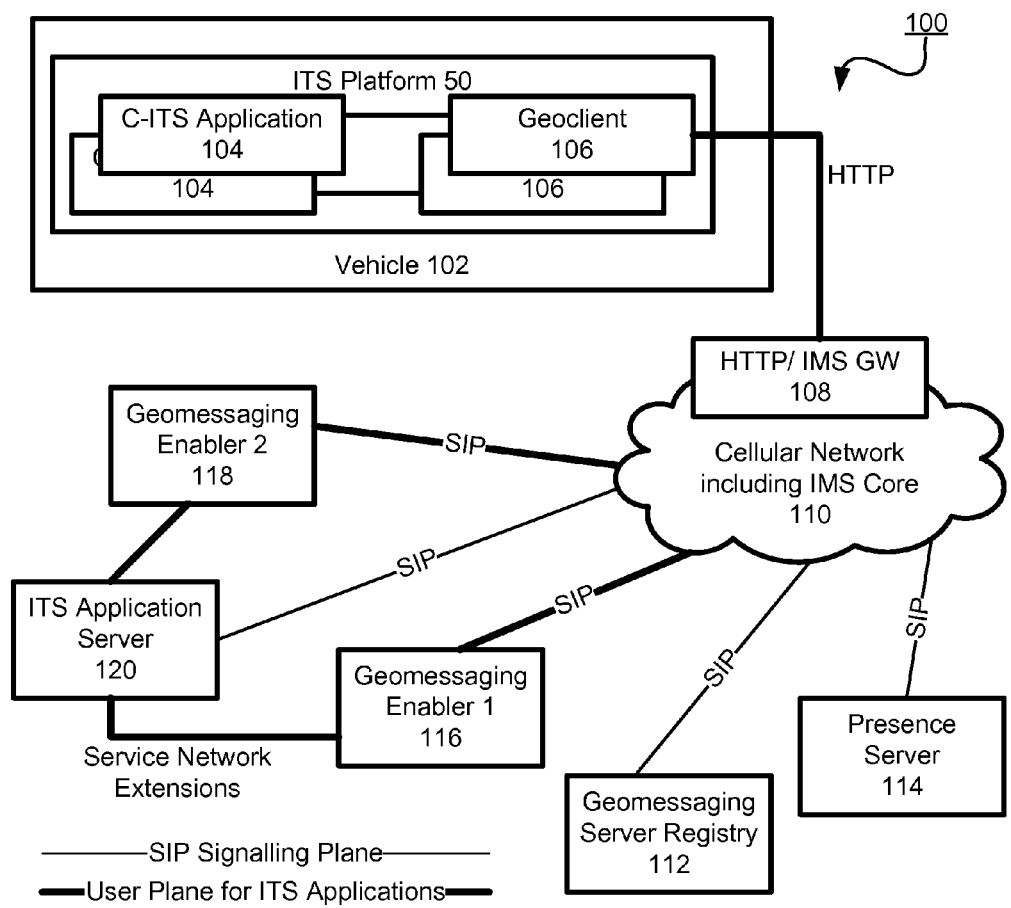
FIG. 2 illustrates an exemplary architecture for an IMS-based ITS infrastructure.

An exemplary distributed architecture 100 is depicted in FIG. 2. In this architecture each Geoclient is allocated an IMS Public Identity. The architecture is based on draft ETSI TR 102 926 v<0.0.4> (2011-11) entitled Intelligent Transport Systems; Framework for public mobile networks in cooperative ITF (C-ITS), the contents of which are incorporated herein by reference. Although the architecture of TR 102 926 defines a series of interacting nodes, the manner in which the nodes function to achieve their stated functions is not necessarily defined. In addition to the nodes described in TR 102 926, the following discussion refers to a geomessaging server registry that is used to maintain a binding between the different geomessaging servers, the locations or regions that each one covers and the registered geoclients handled by every geomessaging server.

As shown in IMS based architecture 100, a vehicle 102 is associated with a vehicle based ITS platform 50 that can support a plurality of C-ITS applications 104 that communicate to an infrastructure based ITS system using an instantiation of Geoclient 106. Geoclient 106 makes use of a mobile data connection, such as an LTE or HSPA connection (although any wireless data communication protocol and connection could be substituted) to an Internet Multimedia Subsystem (IMS) gateway (GW) 108. IMS GW 108 is an element of cellular network 110 that includes an IMS Core Network. Through network 110, IMS GW 108 can connect to a Geomessaging Server Registry 112, a Presence Server 114 and Geomessaging Enablers 118 and 116, which provide access to the ITS Application Server 120.

The IMS gateway typically is called upon to handle the IMS registration of every ITS at power up. Two options for the manner in which this is handled are provided.

In the first option, the IMS gateway will make use of wild carded public identities. As a result, an ITS platform 50 will not have an IMS subscription. Instead, only the IMS gateway requires an IMS subscription (and can actually provide service using a single IMS subscription). The IMS gateway IMS subscription would have a wildcarded public identity allocated to it. Upon successful IMS registration of the IMS gateway, the IMS gateway can allocate a specific IMS public identity to every ITS platform 50 at power up.

In the second option, the IMS GW will make use of a temporary identity. In this option each ITS platform 50 has an IMS subscription in the IMS network but the ITS platform 50 itself does not necessarily have an ISIM application. The IMS gateway does not require an IMS subscription The IMS gateway can emulate the ITS platform 50 when it performs an IMS registration at power up of the ITS platform 50. The IMS public identity of ITS platform 50 can be derived when the IMS gateway performs IMS registration on behalf of the ITS platform 50 at power up. To perform the IMS registration, the IMS gateway can derive a home domain using the identity (IMSI) of the ITS platform. This domain name preferably identifies the node to which the IMS gateway shall send the IMS registration. The IMS gateway can also derive IMS user identities required for the IMS registration from this identity as follows:

The IMS gateway only uses a Private User Identity and Public User Identity specifically reserved for IMS registrations from an IMS gateway reserved for ITS purposes. An exemplary embodiment makes use of Private User Identity and Public User Identity as defined in clauses 20.3.3 and 20.3.4 of 3GPP TS 23.002: 3$^{rd}$ Generation Partnership project; Technical Specification Group Control Network and Terminals; Numbering, addressing and Identification, herein incorporated in their entity. One skilled in the art will appreciate that this would be performed as described save for the substitution of the term ITS for ICS.

Similar to the temporary Public User Identity, the ITS IMS specific Public User Identity can be prevented from being used to originate sessions An IMS gateway can then use only those Public User Identities from the ITS IMS profile to originate an IMS session. Preferably no terminating sessions for those identities is performed. The ITS IMS profile can then be provisioned accordingly.

The following non-limiting exemplary discussion makes some assumptions to provide a secure environment. These assumptions are:

The IMS gateway is pre-provisioned with the following information
  A binding between the MSISDN allocated to an ITS by the cellular service provider, the ITS unique identity, and security credentials for the ITS.
  The security credentials allow the IMS gateway to authenticate and authorize the ITS before the IMS gateway can perform any operation with the IMS core network.
  All HTTP interactions between a Geomessaging client and the IMS Gateway may be subject to HTTP Digest authentication.
In one embodiment, the IMSI is also included in the bindings maintained by the IMS gateway in support of option 2 above Note that as an aid to understanding the data flows, the above security aspects are not shown in the all signaling flows.

Figure 3:
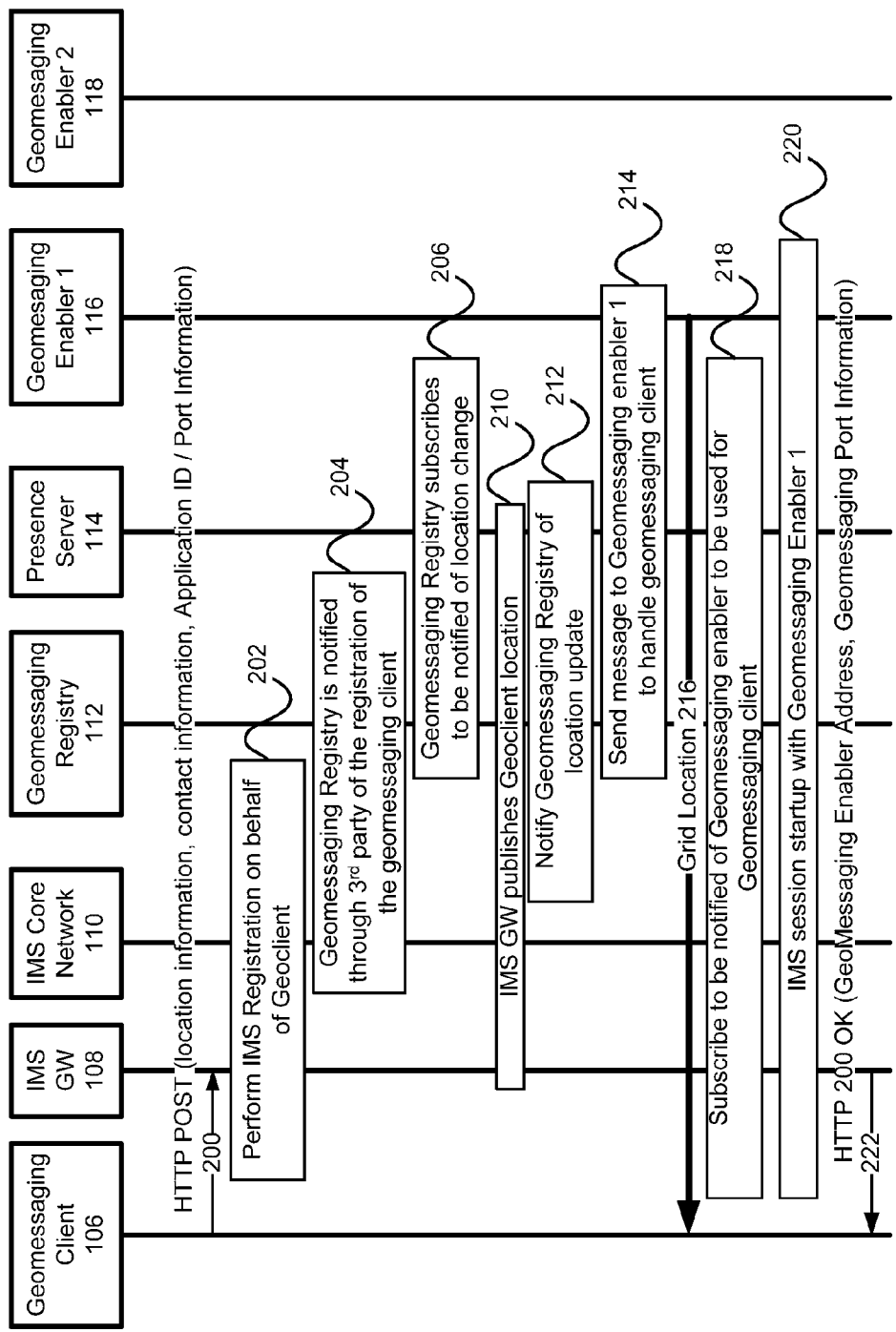
FIG. 3 illustrates an exemplary message flow for registration and power up of a geoclient.

FIG. 3 illustrates an exemplary call flow in which, once the C-ITS 104 is powered up, the Geoclient 106 initiates the procedures associated with power up to register to the IMS network 110, updates its location and is assigned to the appropriate geomessaging enabler, and set up an IMS session for data exchange. Upon detecting availability of C-TIS 106, the Geoclient 106 notifies the IMS GW 108. To that effect, the Geoclient 106 can send a message such as an HTTP POST request 200 to the IMS GW 108 to perform the procedure associated with power up. The Geoclient 106 preferably includes a port number allocated to the C-ITS application 104. Note that the port number provided in message 200 for a C-ITS application may be associated with the DENM basic service 56 and/or the CAM basic service 58 which are used by C-ITS application 104 to communicate with the Geoclient 106. Such a relationship between a C-ITS application 104, the services provided by Facilities Layer 54 and the Geoclient 106 are more fully illustrated in FIG. 1 as previously discussed. The Geoclient 106 may allocate a different port number for every C-ITS application 104 depending on the invocation through the facilities layer 54 depicted in FIG. 1. The one-to-one assignment of a C-ITS application to a port can be used to enable differentiated charging and differentiated QoS for every C-ITS application if needed. The Geoclient 106 maintains a binding between each C-ITS application and the allocated port. In addition to the port number, the Geoclient 106 can include the service Identity (service ID) for this request and which is bound to the port number allocated to the service. This allows routing of traffic to C-ITS application 106 via the appropriate service in the facilities layer 54. This exemplary request also includes location information for the Geoclient 106 as well as the contact information for the Geoclient 106 (typically IP address, and optionally the ITS identity, as well as other pertinent information). Note that the allocation of different port numbers to applications is a matter of configuration in the Geoclient 106. In step 202, the IMS GW 108 performs IMS registration on behalf of the Geoclient 106. IMS registration is typically performed only once and is refreshed autonomously by the IMS GW 108. Accordingly, in this exemplary embodiment the IMS GW 108 is preferably stateful in regards to the ITS Platforms that performed power up procedure. In step 204, the geomessaging registry 112 is notified through third party registration that a new Geoclient 106 is now registered. This exemplary procedure will be understood by those skilled in the art as a standard IMS procedure defined in TS 24.229. In step 206, the Geomessaging registry 112 subscribes to the presence server 114 with a request to be notified of location changes associated with the Geoclient 106. In step 210, the IMS GW 108 publishes to the presence server 114 the location of the Geoclient 106. In step 212, the presence server 114 notifies the geomessaging server registry 112 of the location of the Geoclient 106. The location of Geoclient 106 allows the Geomessaging registry 112 to determine the correct Geomessaging enabler responsible for the Geoclient 106. Typically this determination is done based on a geographic location such as the location provided by presence server 114 in step 212 and predetermined configuration information in the Geomessaging Registry and where the Geomessaging enabler dedicated for a specific geographical location is maintained. In this example, the determination results in the selection of Geomessaging Enabler 1 116. In step 214, the geomessaging server registry 112 sends a message (such as a SIP MESSAGE) to geomessaging enabler 1 116 that includes information including the contact information of the Geoclient 106. In step 216, the geomessaging enabler 1 116 sends the Geoclient 106 a grid update message that includes the tile boundaries. In step 218, the IMS GW 108 subscribes to the geomessaging server registry 112 to be notified of any changes in the geomessaging enabler handling the geoclient 106. In step 220, the IMS GW 108 establishes a session with geomessaging enabler 1 116 which is serving geoclient 106. The IMS session allows the destination port numbers used by geoclient 106 for routing incoming downlink traffic for each application ID, and the associated priorities, in terms of QoS, to be provided to geomessaging enabler 1 116. The IMS session procedure also allows the geomessaging enabler 116 to convey to the geoclient 106, via the IMS GW 108, the destination ports to be used for uplink traffic to the ITS application server 120 and the priorities associated with these ports. The IMS session can further be used to setup the network to handle the ports and IP flows associated with pre-configured Quality of Service profiles for high priority data (and if necessary to open the required pin holes for all traffic). At this point, the IMS session has been established and geomessaging enabler 1 116 has the proper binding for downlink traffic (towards C-ITS application 104), including bindings between the ITS identity, the ITS location, contact information, destination port numbers used by each application resident on the ITS platform, and the priority associated with each port. This information is preferably repeated for each application. By the same token, the IMS GW 108 has all the necessary bindings for uplink traffic (towards the ITS application server 120), and which has to be conveyed to the geoclient 106. In step 222, the IMS GW provides an HTTP 200 OK message to the geoclient 106 with the geomessaging enabler address and information related to the Geomessaging ports to be used.

Geoclient 106 can then use the incoming information to establish the necessary bindings for uplink traffic to Geomessaging Enabler 1 116. These bindings can include the binding between the application ID, the destination port in Geomessaging Enabler 1 116 and the associated priority.

Figure 4:
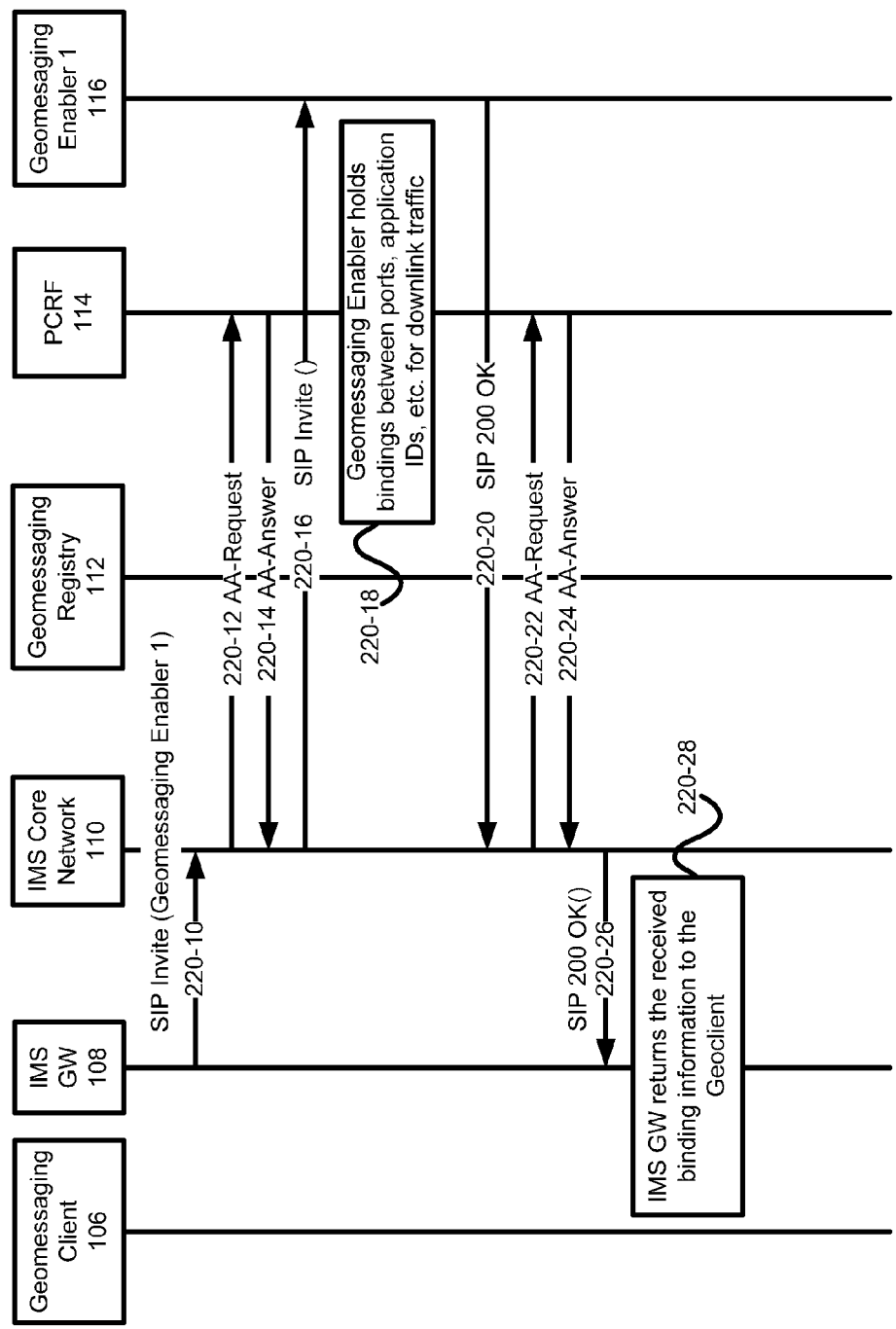
FIG. 4 illustrates an exemplary embodiment of an IMS session startup.

With respect to step 220 of FIG. 3, FIG. 4 provides an exemplary call flow of the IMS session setup. IMS GW 108 issues a SIP INVITE 220-10 to Geomessaging Enabler 1 116 via IMS core network 110. The Session Description Protocol (SDP) included in the SIP INVITE can include all the flows for all the applications supported by Geoclient 106. Information in regard the pre-configured QoS for the flows of high priority can also be included in the SDP. As stated previously, in an exemplary embodiment, there would be 2 flows per application, one with best effort QoS, one with pre-provisioned QoS for high priority related data. In step 220-12 and 220-14 the IMS core network 110 updates the PCRF 114 through an Rx interface to perform any necessary authorization and install the proper the QoS tuples for each flow in the SDP included in the SIP INVITE 220-10. The IMS core network 110 issues a SIP INVITE 220-16 to Geomessaging Enabler 1 116 including the SDP received from the IMS network 110. Geomessaging Enabler 1 116 establishes the necessary bindings for downlink traffic as described in the power setup procedure during step 220-18.

Geomessaging Enabler 1 116 responds with a SIP 200 OK 220-20 including its answer to the offer it received and also includes the relevant destination Geomessaging ports used for routing uplink traffic. In messages 220-22 and 220-24, the IMS core network 110 updates the PCRF 114 through the Rx interface to perform the necessary authorization and install the proper the QoS tuples based on the final received response. The IMS core network 110 then forwards a SIP 200 OK 220-26 response to the IMS GW 108. At this point, the IMS GW can, in step 220-28, return the receiving binding information to the Geoclient 106.

Figure 5:
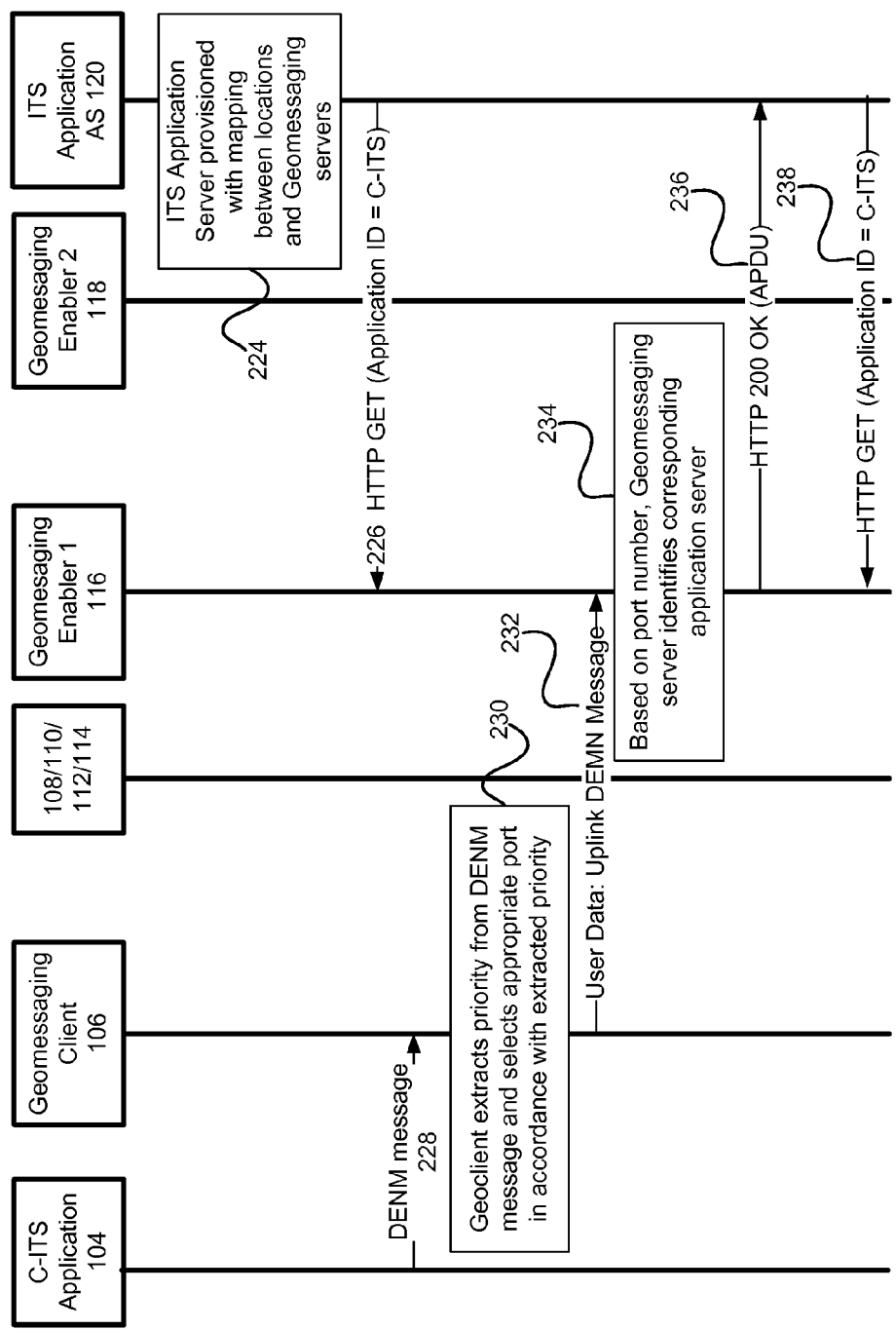
FIG. 5 illustrates an exemplary embodiment of an upstream message flow.

FIG. 5 is an exemplary call flow for a data exchange in for the uplink connection. It is assumed, as discussed above, in the illustrated exemplary embodiments, that for traffic purposes the Geomessaging Enabler dedicates a specific port per application server per priority for incoming traffic and each application server handles one or more applications having unique application IDs. The binding between the destination ports (used by the geoclient 106) and application server is typically static information and is pre-configured in the Geomessaging Enabler.

To ensure that traffic can be routed from an application in ITS platform 50 using the Geoclient 106 to the proper Application server 120 typically requires maintaining, at the Geoclient 106, a binding between the destination port to be used for the specific application ID and the priority associated with that port. This information typically will be maintained by every Geoclient instance for the application it handles and can be conveyed to the geoclient during signaling at power up as depicted previously.

One skilled in the art will appreciate that ITS application server 120 is typically provisioned with the mapping between locations and the corresponding geomessaging enabler allocated to a specific location as shown in step 224. In step 226, in anticipation of receiving traffic from the Geomessaging Enabler 1 116, the ITS Application Server (AS) 120 sends an HTTP GET request to the Geomessaging Enabler 1 116 and includes the service identity for the ITS AS 120 in the request (long poll). One skilled in the art will appreciate that this step will be repeated for every Geomessaging Enabler configured in the ITS application server 120, however for the sake of clarity, it is only shown once. In message 228, the C-ITS application 104 sends a DENM message 228 to the instantiation of Geoclient 106, associated with DENM basic service 56 in FIG. 1, to provide the Geoclient 106 with relevant data. The receipt of this data serves to initiate the start of a determination in step 230 of a priority in the incoming message. In the received DENM message (for example a DENM Application Protocol Data Unit (APDU)), there is a priority indicator. This indicator is analyzed by the Geoclient 106 to determine the appropriate port number over which the message should be sent.

In step 232, the geoclient 106 sends the ITS DENM message received in message 228 to geomessaging enabler 1 116 using a previously established TCP connection (one skilled in the art will appreciate that other protocols, such as UDP, could be used in other embodiments). In step 234 the geomessaging enabler 1 116 determines the target application server based on the port over which the message 232 was received. In step 236, the geomessaging enabler 1 116 returns an HTTP 200 OK to the ITS AS 120. This message includes the application data received in uplink message 232. In step 238, in anticipation of receiving further traffic from the Geomessaging Enabler 1 116, the ITS AS 120 sends a new HTTP GET request to the Geomessaging Enabler and includes the service identity in the request allowing the process to repeat itself as necessary.

Figure 6:
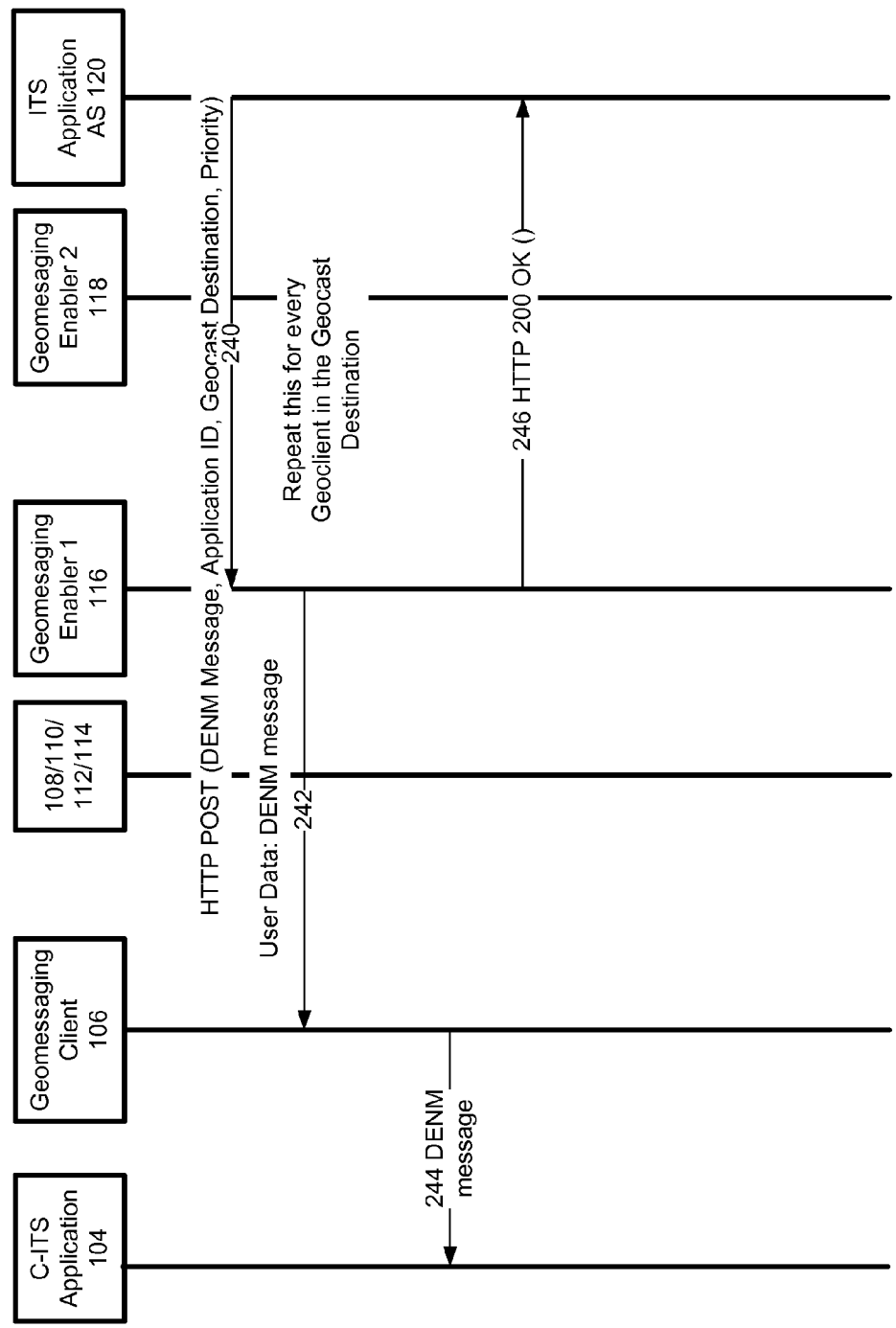
FIG. 6 illustrates an exemplary embodiment of a downstream message flow.

FIG. 6 illustrates an exemplary call flow for a downlink data transmission. ITS AS 120 has a DENM message that should be transmitted to all ITS platforms within a specific geographic destination. In message 240, ITS AS 120 sends an HTTP POST message to the Geomessaging enabler 1 116 which is responsible for the destination area. The HTTP post includes the DEMN APDU, the application or service ID, priority of the message, and the geographic destination over which the message should be distributed. Geomessaging enabler 1 116 identifies all geoclients in the specific area of interest, and for each geoclient, geomessaging enabler 1 116 identifies the appropriate port number matching the requested priority and associated application or service ID. This identification can be done using the stored downlink bindings that have been previously established. Then, using the contact information and the appropriate port number, a downlink DENM message is sent to geoclient 106 (and all other identified geoclients). Geoclient 106 has a binding between the port number over which is receives message 242 and the DENM basic service. As a result, geoclient 106 sends DENM message 244 to the DENM basic service to be delivered to the relevant C-ITS application 104. Upon sending message 242 to each identified geoclient, Geomessaging Enabler 1 116 provides and HTTP 200 OK message 246 to ITS AS 120.

Figure 7:
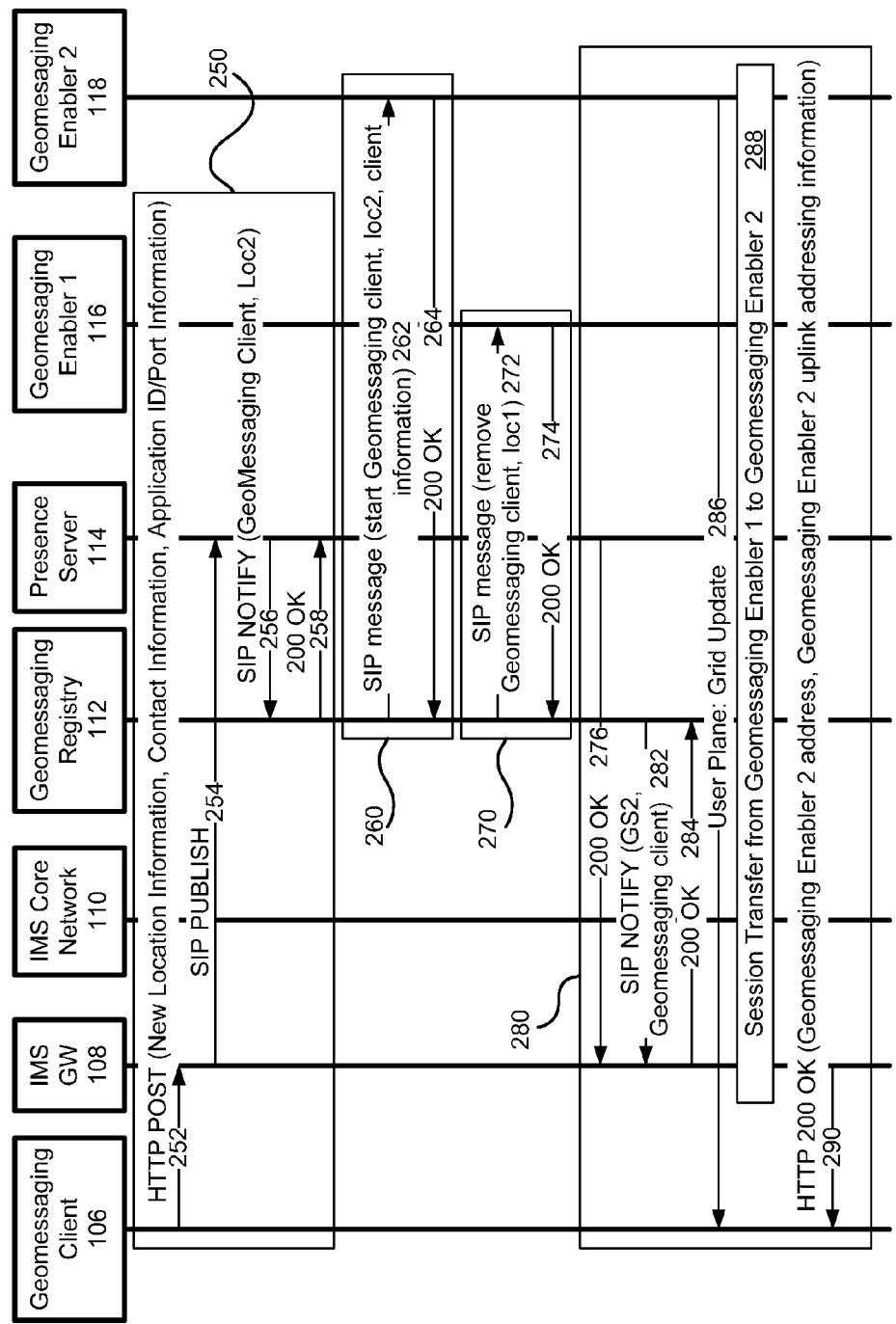
FIG. 7 illustrates an exemplary embodiment of a change of geomessaging servers due to location change.

FIG. 7 illustrates a call flow for a change of geomessaging enabler server when the Geoclient 106 roams. In step 250, the Geomessaging Registry 112 receives notification from the Geoclient 106 that it is leaving the service area associated with Geomessaging Enabler 1 116. In one implementation this is achieved by Geoclient 106 providing location information and contact information to IMS GW 108 in message 252 which in this exemplary embodiment is shown as an HTTP POST message. In an exemplary embodiment, this message may be identical to the message sent to the IMS GW 108 by the geoclient 106 at power up of the ITS platform as shown in FIG. 3. In response to receipt of message 252, and because IMS GW 108 is stateful to ITSs that powered-up, so it can autonomously refresh the IMS registration, as depicted in FIG. 3, the IMS GW 108 concludes that this message is associated with geoclient 106 moving into a new service area. Consequently, the IMS GW 108 publishes the location information to presence server 114 using SIP PUBLISH message 254. In response to a previous subscription request, Presence server 114 transmits notification of the change in location to Geomessaging Registry 112 using, for example, a SIP NOTIFY message in step 256 including a geoclient identifier and the location information. In response Geomessaging Registry 112 responds in message 258 to confirm receipt.

In step 260, the Geomessaging Registry 112 provides notification of the arrival of Geoclient 106 to new Geomessaging enabler 2 118. Geomessaging enabler 2 118 is responsible for handling the ITS platform while it is the new area. As illustrated, the geomessaging registry 112 locates the geomessaging enabler allocated for the new location and sends a SIP MESSAGE 262 to it to inform it of the Geoclient 106 contact information and reported location. Geomessaging Enabler 2 118 then replies with a SIP 200 OK message 264. In step 270, the geomessaging registry 112 provides notification to the previous Geomessaging Enabler that Geoclient 106 has left its service area. As shown in the illustrated example, Geomessaging Registry 112 sends a SIP MESSAGE 272 to Geomessaging enabler 1 116 to inform it of the removal of the old Geoclient contact information from the old location associated with the Geoclient 106. The Geomessaging Enabler 1 116 returns a SIP 200 OK response 274 to the geomessaging registry 112. The Presence server 114 can then return a SIP 200 OK response 276 to the IMS GW 108.

In step 280, the Geomessaging registry 114 transmits information about the new Geomessaging enabler towards the geoclient 106. As illustrated, Geomessaging Registry 112 sends a SIP NOTIFY 282 to the IMS GW 108 to inform it of the new geomessaging enabler that will handle the Geoclient 106. The IMS GW 106 returns a SIP 200 OK response 284 to the geomessaging registry 112. In step 286, the newly allocated Geomessaging Enabler 2 118 sends a user data message to Geoclient 106 to provide a new location grid. In step 288, the IMS GW 108 performs a session transfer to Geomessaging enabler 2 118 to allow traffic to flow to the geomessaging enabler appropriate to the current location of Geoclient 106. To that effect, the IMS GW 108 can create a new IMS session with the Geomessaging Enabler 2 118 and tears down the existing IMS session with the Geomessaging Enabler 1 116. Similar to the IMS session setup at ITS power up in FIG. 3 and FIG. 4, the setup of the new IMS session between the IMS GW 108 and the new geomessaging enabler 2 118 preferably allows both the IMS GW 108 and the geomessaging enabler 118 to establish the necessary binding information at both ends to allow routing of uplink and downlink traffic. Subsequently the IMS GW 108 sends the binding information to the Geoclient 106.

In step 290, the IMS GW sends an HTTP 200 OK to the Geoclient 106 and includes information identifying the Geomessaging Enabler 2 118 which has now been allocated responsibility for handling the Geoclient 106, as well as the necessary binding information.

Figure 8:
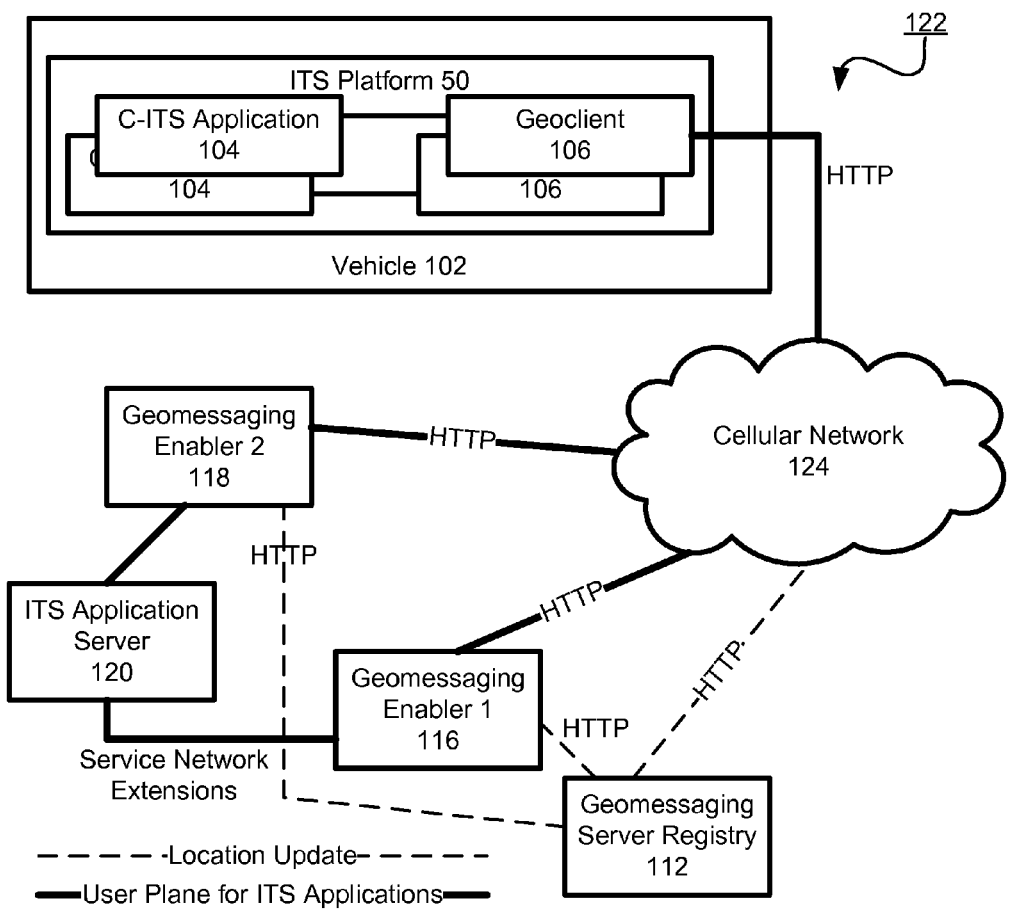
FIG. 8 illustrates an exemplary architecture for an IP-based ITS infrastructure.

An exemplary embodiment of a non-IMS environment based architecture 122 is shown in FIG. 8. As before, a vehicle 122 contains an ITS platform 50 with at least one C-ITS application 104, in conjunction with an instantiation of Geoclient 106. A data connection is provided through a wireless network such as a cellular network 124, to resources such as the geomessaging server registry 112, Geomessaging enabler 1 116, Geomessaging enabler 2 118 and ITS Application Server 120.

Those skilled in the art will appreciate that the establishment of the required connections is similar in scope to the methods illustrated above, but without use of the IMS specific nodes and the IMS data messages. In their place, the Geoclient 106 connects directly to the geomessaging registry 112.

Figure 9:
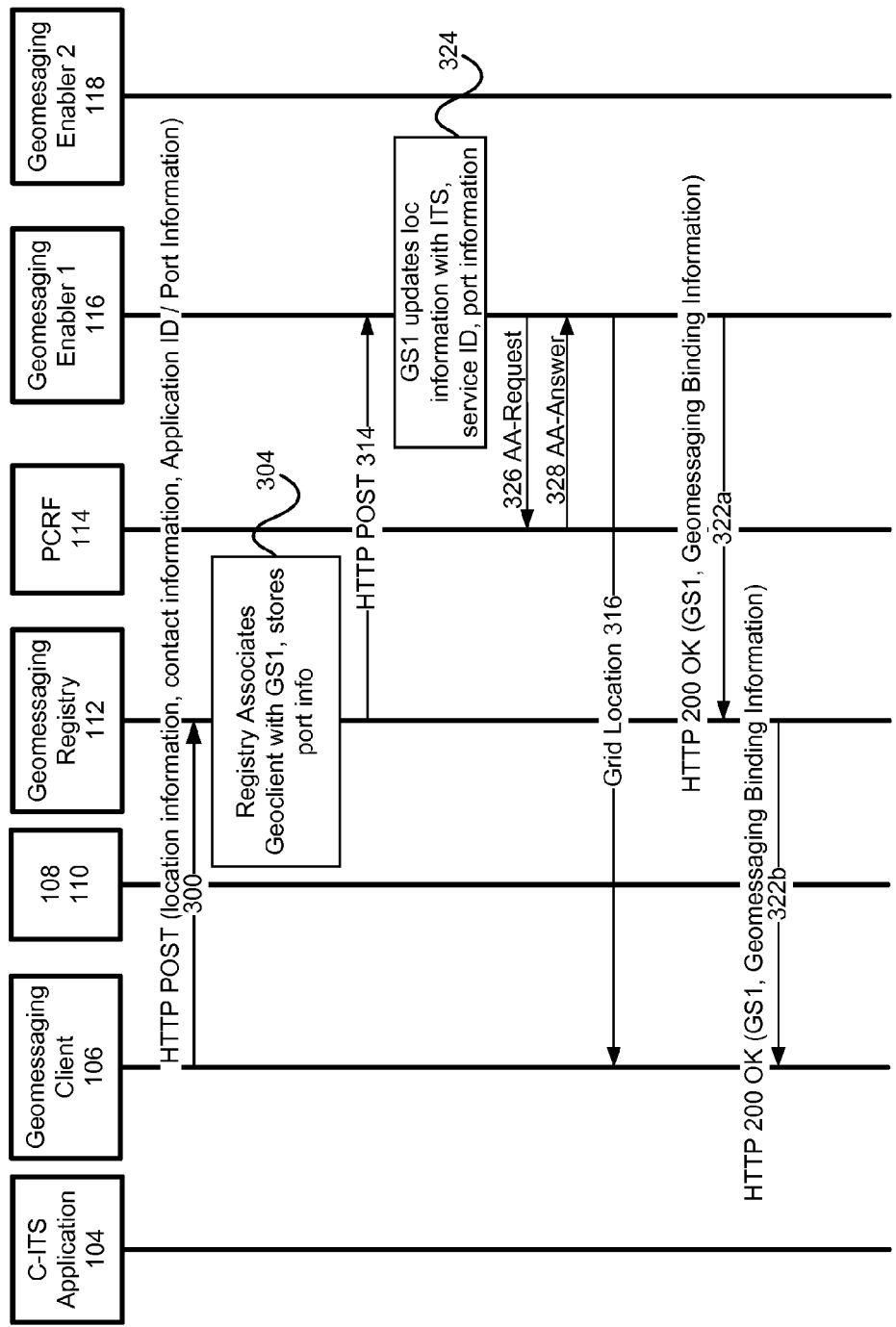
FIG. 9 illustrates an exemplary message flow for registration and power up of a geoclient.
Figure 10:
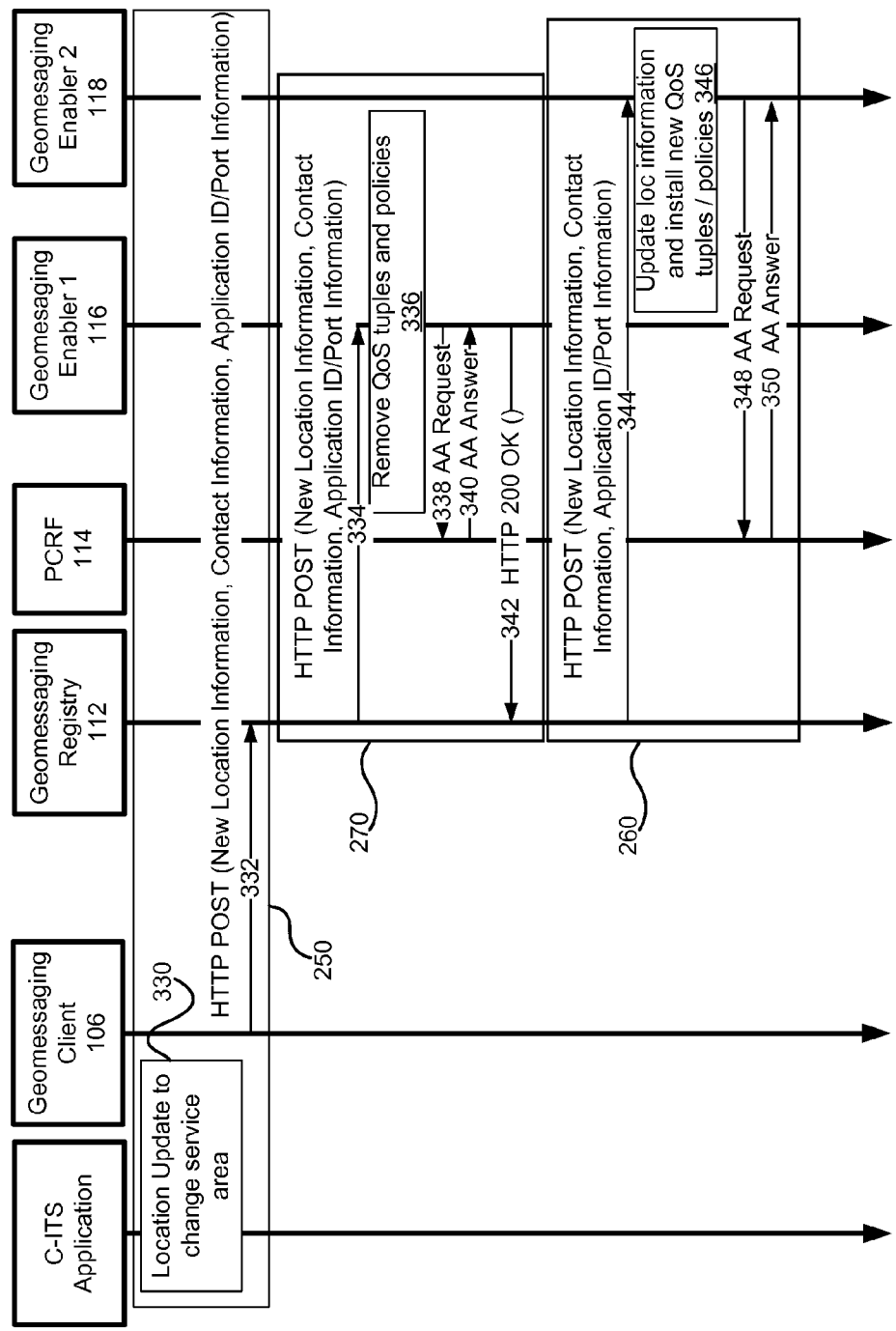
FIG. 10 illustrates an exemplary embodiment of a change of geomessaging servers due to location change.
Figure 10:
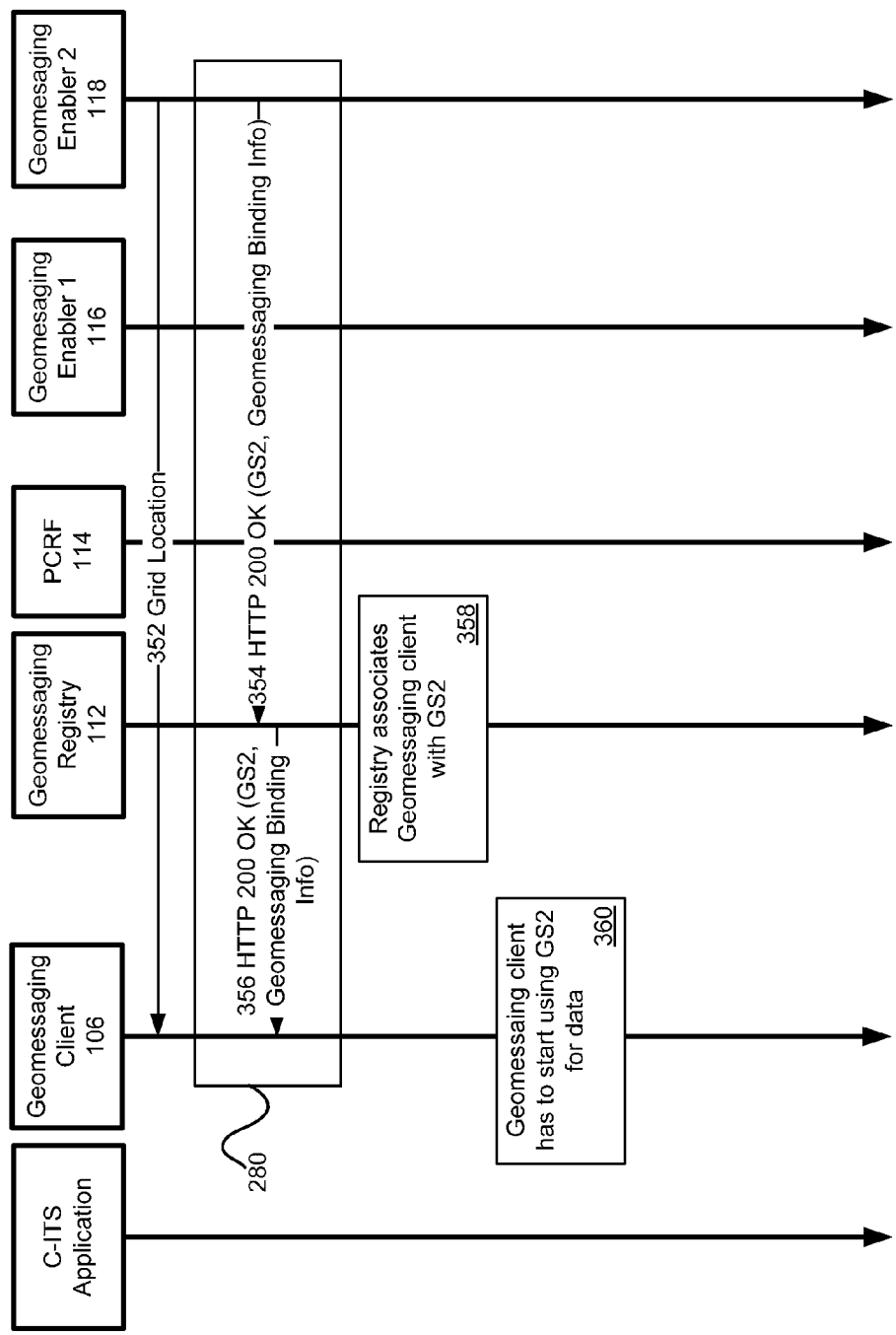

FIG. 9 illustrates an exemplary power up in a non-IMS environment of an ITS platform hosting C-ITS application 104 and Geoclient 106. In step 300, a message, such as an HTTP POST, is used to send information about the geoclient 106 to the geomessaging registry 112. One skilled in the art will appreciate that the HTTP POST message 300 could be used to send location information, contact information, and application ID port information that are of use to various different network nodes. In step 304, the geomessaging registry 112 associates the geoclient 106 with the geomessaging enabler 1 116 (based on the reported location) and stores this association. Information about geoclient 106 is provided to geomessaging enabler 1 116 in message 314, which can be implemented as an HTTP POST. In step 324, the geomessaging enabler 1 116 updates its location information with the information provided in message 314. Such information can include the location of the ITS platform, the service identifier and port information as illustrated. QoS filters and appropriate policies, if needed, can be set up with the PCRF 114 through AA Request 326 and AA Answer 328. Geomessaging enabler 1 116 will also send Grid Location data 316 to the Geoclient 106. Geomessaging enabler 1 116 can provide an HTTP 200 OK message 322a to the Geomessaging Registry 112. This message may preferably include identification of the geomessaging enabler 1 116, and Geomessaging Binding information. This information can then be forwarded to the Geoclient 106 as HTTP 200 OK message 322b. One skilled in the art will appreciate that the change from an IMS to an IP based infrastructure does not have discernable impacts upon the geoclient 106, allowing the same geoclient to be used in both IMS and non-IMS environments. transparently The following is a brief description of the steps in the call flow of FIG. 10, which shows the process of a change of geomessaging enabler due to roaming of the geoclient in a non-IMS based environment. In step 250, the Geoclient 106 updates its location and roams to a new service area in step 330. In step 332 the Geomessaging Registry 112 receives notification from the Geoclient 106 that it is leaving the service area associated with Geomessaging Enabler 1 116. In one implementation this is achieved by Geoclient 106 providing a location update along with new location and contact information in message 292 which in this exemplary embodiment is shown as an HTTP POST message. It is important to note that in this exemplary embodiment message 332 is identical to the one sent by the geoclient in the IMS-based environment under similar circumstances and which is identical to the message that is sent at ITS power up in both environments.

In step 270, the geomessaging registry 112 provides notification to the previous Geomessaging Enabler that Geoclient 106 has left its service area. As shown in the illustrated example, Geomessaging Registry 112 sends an HTTP POST message 334 to Geomessaging enabler 1 116 to inform it of the removal of the old Geoclient contact information from the old location associated with the Geoclient 106. The Geomessaging Enabler 1 116 updates its location information accordingly in step 336 and can remove QoS filters in the PCRF 114 as well as stored state information associated with geoclient 106. The removal of QoS filters in PCRF 114 can be accomplished using AA Request 338 and AA Answer message 340 using existing 3GPP standards for this exemplary example. Upon effective removal of geoclient 106 from its records, geomessaging enabler 1 116 returns an HTTP 200 OK response 342 to the geomessaging registry 112.

In step 260, the Geomessaging Registry 112 provides notification of the arrival of Geoclient 106 to Geomessaging enabler 2 118 responsible for the new location. As illustrated, the geomessaging registry 112 sends an HTTP POST 344 to Geomessaging enabler 2 118 containing the received updated addressing information along with other data such as service ID port information. This provides the Geomessaging enabler 2 118, with the Geoclient 106 contact information and reported location, and in the exemplary embodiment also provides the information necessary to establish the bindings needed at the Geomessaging Enabler 2 118 for routing downlink traffic to the Geoclient 106. Geomessaging Enabler 2 118 then updates its location information to add the location of geoclient 106 in step 346. Using AA Request 348 and AA Answer 350, Geomessaging Enabler 2 118 and PCRF 114 to establish the necessary authorization and establish the necessary QoS Filters in the network.

In step 352, the Geomessaging Enabler 2 118 transmits grid location information to the Geoclient 106. In step 280, the Geomessaging registry 114 transmits the to the geoclient 106 the necessary information needed by the geoclient 106 about the new Geomessaging enabler such as binding information to be used for routing uplink traffic towards the geomessaging enabler 2 118 and ITS application server 120. As illustrated, Geomessaging Registry 112 receives an HTTP 200 OK message 354 from Geomessaging Enabler 2 118 containing information such as the binding and identification information. This information is then forwarded to Geoclient 106 in message 356.

In step 358, Geomessaging registry 112 associates geoclient 106 with Geomessaging Enabler 2 118, updating its stored information, and in step 360, the geoclient 106 updates contact and stored binding information so that it will directly communicate with the geomessaging enabler 2 118 using the newly provided information.

Figure 11:
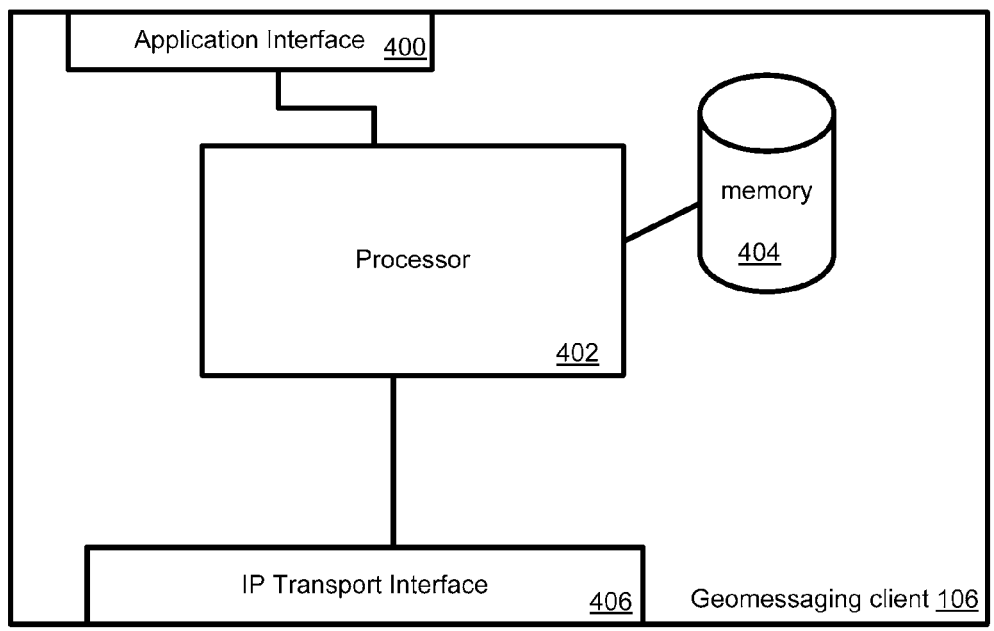
FIG. 11 illustrates an exemplary embodiment of a geomessaging client.

FIG. 11 illustrates an exemplary embodiment of a Geomessaging client 106 (also referred to as a geoclient) of the instant invention. Geoclient 106 has an application interface 400 through which is communicates with applications, such as other applications 64 (as illustrated in FIG. 1) or C-ITS applications 104 through facilities layer 54. Messages received over application interface 400 are parsed by processor 402 so that priority data stored in the received message can be ascertained. On the basis of the priority data and the application from which the message is received, a port over which to send the message can be determined through consultation with binding information stored in memory 406. The message is then sent towards the Geomessaging enabler through IP Transport Interface 406 which ensures that the IP Transport and Networking services 70 (as shown in FIG. 1) will deliver the message to the port associated with the application and priority. When messages are received from the network, they are received over IP transport interface 406, which provides the message and information identifying the port over which the message was received to the processor 402. Based on the received port, a binding in memory 404 can be used to determine the priority with which the message should be sent out over application interface 400.

Figure 12:
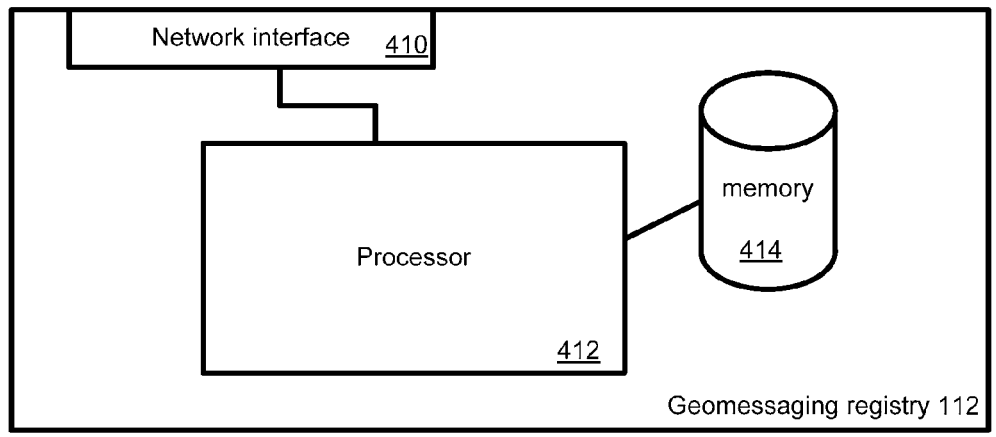
FIG. 12 illustrates an exemplary embodiment of a geomessaging registry.

FIG. 12 illustrates an exemplary embodiment of a geomessaging registry 112. Geomessaging registry 112 has a network interface 410 through which it can directly or indirectly communicate with the geomessaging client 106 and the geomessaging enablement servers 116 and 118. Those skilled in the art will appreciate that some of these communications are logically direct communications, while others are indirect communications, such as messages for the geoclient 106 being transmitted to the IMS GW 108. As explained above with respect to the message flow diagrams, the processor 412 receives information related to the geoclient location, and based on that information can instruct the geomessaging enablement server associated (the association being stored in the memory 414) with the geoclient to unregister the geoclient, while instructing a second geomessaging enablement server to register the geoclient. The processor can then transmit instructions towards the geoclient instructing the geoclient to begin using the services of the second geomessaging enablement server. One skilled in the art will appreciate that the processor 412 can send these instructions using the network interface 410.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

One skilled in the art will appreciate that the nodes of the above discussion can be implemented as upstream and downstream network interfaces used to communicate with other network nodes, and a processor for receiving messages from external nodes, and acting upon them, as well as for transmitting message through the network interfaces to other nodes. The upstream and downstream network interfaces can alternatively be interfaces to specific nodes, or could be a single network interface connecting the node to the network through which other nodes are accessed. A memory can be accessible to the processor for both storing and modifying data according to the received messages and corresponding processes invoked as a result of the receipt of the message, and for storing instructions that allow the processor to perform the steps referred to above in response to the conditions leading up to the execution of the recited steps.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method, for execution at a geomessaging registry, of transferring responsibility for a geomessaging client, located in a first geographical area and associated with a vehicle based intelligent transportation system (ITS) platform, from a first server responsible for the first geographic area to a second server responsible for a second geographic area, the method comprising:
receiving, at the geomessaging registry, an indication, originating from the geomessaging client remote from the geomessaging registry, of a change of location of the geomessaging client from the first geographic area to the second geographic area;
responsive to receiving the indication of a change of location of the geomessaging client from the first geographic area to the second geographic area:
transmitting, by the geomessaging registry, to the second server, an identification and a location of the geomessaging client and instructions to register the geomessaging client based on the identification and location of the geomessaging client;
transmitting, by the geomessaging registry, to the first server, instructions to remove data associated with the geomessaging client and to unregister the geomessaging client; and
transmitting, by the geomessaging registry, towards the geomessaging client identification of the second server and instructions to communicate with the second server in place of the first server.

2. The method of claim 1 wherein the step of receiving an indication includes receiving a SIP NOTIFY message from a presence server responsive to receipt, by the presence server, of a location update originating from the geomessaging client.

3. The method of claim 1 wherein the step of instructing the first server is performed prior to the step of instructing the second server.

4. The method of claim 1 wherein the step of instructing the second server includes transmitting a SIP message identifying the geomessaging client, a new location associated with the geomessaging client and contact information associated with the geomessaging client.

5. The method of claim 1 wherein the step of instructing the first server includes transmitting a SIP message instructing the first server to remove information associated with the geomessaging client.

6. The method of claim 5 wherein the SIP message also identifies a location associated with the geomessaging client by the first server.

7. The method of claim 1 wherein the step of transmitting includes transmitting identification of the second server to an IMS gateway associated with the geomessaging client.

8. The method of claim 7 wherein the identification of the second server is accompanied by identification of the geomessaging client.

9. The method of claim 1 wherein the step of receiving includes receiving a HTTP POST message from the geomessaging client.

10. The method of claim 9 wherein the HTTP POST message includes new location information, contact information and application identification associated with the geomessaging client.

11. The method of claim 9 wherein the step of instructing the first server includes transmitting an HTTP POST message determined in accordance with the received HTTP POST message.

12. The method of claim 9 wherein the step of instructing the second server includes transmitting an HTTP POST message determined in accordance with the received HTTP POST message.

13. The method of claim 9 wherein the step of transmitting includes receiving from the second server identification information in an HTTP 200 OK message.

14. The method of claim 13 wherein the identification information received from the second server includes binding information for use by the geomessaging client.

15. The method of claim 13 wherein the step of transmitting further includes transmitting the identification of a second server to the geomessaging client in an HTTP 200 OK message.

16. The method of claim 15 wherein the transmitted HTTP 200 OK message is created in accordance with the received HTTP 200 OK message.

17. The method of claim 1 further including the step of associating the geomessaging client with the second server in a memory accessible to the geomessaging registry.

18. The method of claim 1 wherein the step of instructing the second server comprises identifying the geomessaging client, the new location associated with the geomessaging client, and contact information associated with the geomessaging client.

19. The method of claim 1 wherein the first and second servers and the geomessaging registry are configured to provide different services to the geomessaging client.

20. A geomessaging registry for associating a geomessaging client with one of a plurality of geomessaging enablement servers, the registry comprising:
a network interface for communicating with the geomessaging client remote from the geomessaging registry and with each of the plurality of geomessaging enablement servers; and
a processor for determining, in accordance with a communication originating from the geomessaging client, that the geomessaging client is associated with a first geomessaging enablement server in the plurality of geomessaging enablement servers but should be associated with a second geomessaging enablement server in the plurality of geomessaging enablement servers and, responsive to this determination, for transmitting instructions to the first geomessaging enablement server to remove data associated with the geomessaging client and to unregister the geomessaging client, for transmitting to the second geomessaging enablement server an identification and a location of the geomessaging client, instructions to register the geomessaging client based on the identification and location of the geomessaging client, and instructions to begin providing geomessaging enablement services to the geomessaging client, and for transmitting towards the geomessaging client instructions to begin using services provided by the second geomessaging enablement server.

21. The geomessaging registry of claim 20 wherein the network interface communicates directly with the geomessaging client using HTTP.

22. The geomessaging registry of claim 20 wherein the network interface communicates with the geomessaging client through an IMS/HTTP gateway.

23. The geomessaging registry of claim 20 wherein transmitting instructions to the second geomessaging enablement server comprises identifying the geomessaging client, a new location associated with the geomessaging client, and contact information associated with the geomessaging client.

24. The geomessaging registry of claim 20 wherein the geomessaging enablement servers and the geomessaging registry are configured to provide different services to the geomessaging client.

25. A non-transitory computer-readable medium having stored therein instructions which, when executed by a geomessaging registry, cause the geomessaging registry to transfer responsibility for a geomessaging client, located in a first geographical area and associated with a vehicle based intelligent transportation system (ITS) platform, from a first server responsible for the first geographic area to a second server responsible for a second geographic area, by performing a method comprising:

receiving, by the geomessaging registry, an indication, originating from the geomessaging client remote from the geomessaging registry, of a change of location of the geomessaging client from the first geographic area to the second geographic area;

responsive to receiving the indication of a change of location of the geomessaging client from the first geographic area to the second geographic area:

transmitting, by the geomessaging registry, to the second server, an identification and a location of the geomessaging client and instructions to register the geomessaging client based on the identification and location of the geomessaging client;

transmitting, by the geomessaging registry, to the first server, instructions to remove data associated with the geomessaging client and to unregister the geomessaging client; and transmitting, by the geomessaging registry, towards the geomessaging client identification of the second server and instructions to communicate with the second server in place of the first server.

\* \* \* \* \*